Figure 1:
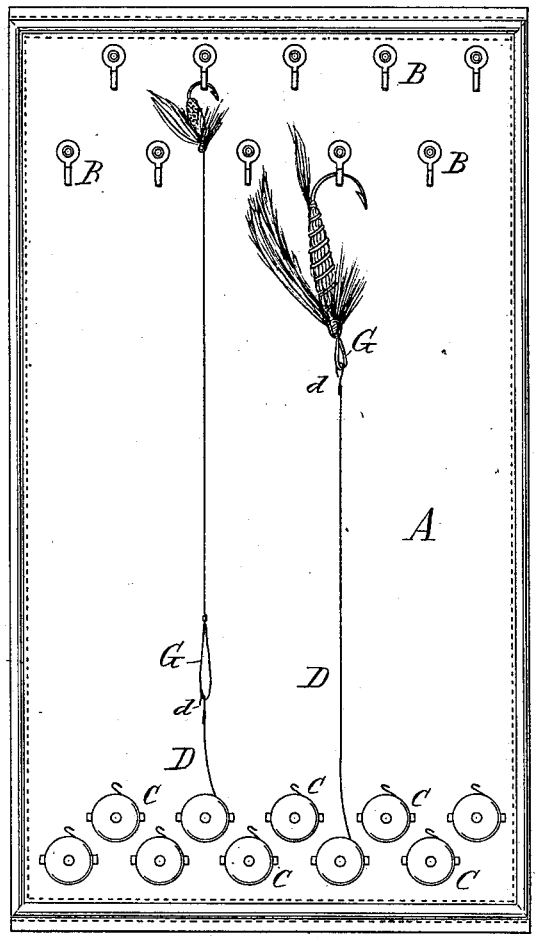

(No Model.)

H. P. WELLS.
FISHING FLY BOOK.

No. 335,491. Patented Feb. 2, 1886.

WITNESSES

INVENTOR

UNITED STATES PATENT OFFICE.

HENRY P. WELLS, OF BROOKLYN, ASSIGNOR TO THOMAS J. CONROY, OF NEW YORK, N. Y.

FISHING-FLY BOOK.

SPECIFICATION forming part of Letters Patent No. 335,491, dated February 2, 1886.

Application filed August 26, 1885. Serial No. 175,371. (No model.)

*To all whom it may concern:*

Be it known that I, HENRY P. WELLS, of the city of Brooklyn, in the county of Kings and State of New York, have invented a new and useful Improvement in Fishing-Fly Books, of which the following is a specification, reference being had to the accompanying drawings.

Fly-books for the use of anglers have been made of late years with leaves provided with retaining hooks or clips at one end, and with spiral springs terminating in a hook at the other end, of the page. The fish-hook forming the foundation of the artificial fly (to contain and preserve which latter is the object of the fly-book) is placed upon the retaining-hook attached to the leaf, while a loop in the gut attached to said fly is engaged with the hook which terminates the spiral spring. Thus the gut is kept always straight and ready for immediate use, while any fly in the book may be readily removed or replaced without disturbing the others.

My invention is an improvement on this form of fly-book.

While said fly-book is unquestionably a great improvement upon the old style, (wherein the gut attached to each fly was necessarily coiled up before the fly could be placed in the book, whereby the various flies became more or less entangled together, and the intentional removal of one brought with it the accidental removal of others, and whereby it became necessary to straighten by a distinct and oftentimes troublesome operation the gut attached to a fly before it could be used,) still it is open to the following objections: The fly-book is in use to be carried in the pocket of the angler, and therefore excessive length must be avoided; yet it is desirable that the gut attached to the fly should either be as long as possible, that the disturbance of the water caused by the loops which attach the fly to the leader and the glittering bubble of air often immeshed within said loops should both be as far removed from the fly itself as possible, or that the fly should be provided with a small loop directly at its head, so that said disturbance may be supposed by the suspicious fish to be due to the motion of the fly itself.

The spiral spring necessarily takes up a considerable portion of the length of the page of the fly-book, thus requiring either an inconvenient length of book to give room for the gut, or that the gut attached to the fly, if the long gut is used, be made shorter than is desirable, while if the small gut loop at the head of the fly is used the spiral spring must be brought much nearer the retaining-hooks attached to the leaf. In either case the leaf can be used but for one of these styles of fly, to the absolute exclusion of the other. Again, the elastic limit of extensibility in the spiral spring is quite limited, and if this be once exceeded the resiliency of the spring is destroyed and its usefulness is at an end. Therefore the distance between the bend of the fish-hook, which is to engage with the retaining-hook affixed to the page, and the end of the gut-loop, which is to be attached to the spring, must be confined within narrow limits, and the fly-gut length must be carefully regulated by the length of the fly-book; otherwise the fly and its gut will either exceed the distance between the points of attachment on the page, or they will be so much shorter as to stretch the spring beyond its elastic limit. When it is remembered that the length of the gut must be varied with any marked variation in the size of the fish-hooks employed, and that the angler usually purchases his flies a few at a time from many different makers and in many different localities, it will be seen that this, as well as the others, is a serious objection to the style of fly-book in question.

My invention is intended to meet and overcome all these objections.

Figure 2:
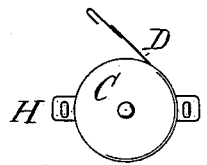
Figure 3:
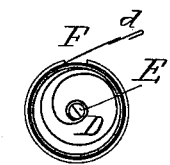
Figure 4:
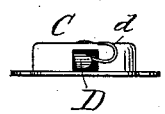
Figure 5:
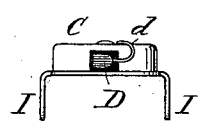
Figure 6:
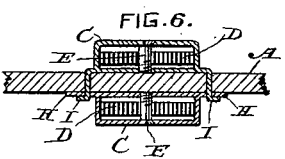

Figure 1 represents a leaf of my fly-book; Fig. 2, a box containing a helical spring; Fig. 3, said box with its cover removed, so as to disclose said spring; Figs. 4 and 5, elevations of said box, showing means by which it may be attached to the leaf.

A represents a leaf of my fly-book, stiffened at the edges by any of the methods now in use, or made of material sufficiently stiff in itself to withstand the strain of the springs hereinafter described, without bending; B B, a series of retaining-hooks attached to the leaf; C, a series of boxes equaling in number the retaining-hooks B, and so located as to be opposed to them, and each containing a helical spring. D represents a portion of said helical spring as the same is withdrawn from said box. Said helical spring D is composed of any narrow material of sufficient resiliency, preferably flat metal wire. It is fixed at its inner end to the post E, (see Fig. 3,) while the other and free end terminates in a small hook, d, which projects through an opening, F, in the side of the box C. By the term "helical spring," as used in this case, I mean a spring coiled as the mainspring of a watch. The boxes C, each containing a spring, are attached to the leaf by rivets, or in any other of the many methods employed for analogous purposes, but in such a position that the opening F in each of the boxes C is opposite one of the hooks B.

Figs. 2 and 5 show a convenient method of attaching said boxes C to the leaf A, when it is desired to place a box on each side of the leaf. Said boxes would then be naturally placed opposite one another. Fig. 2 shows such a box provided with two perforated ears, H, while Fig. 5 shows such a box provided with two points or projections, I. The box shown in Fig. 5 may be placed upon one side of the leaf, the projections I thrust through the same, so as to appear upon the other side of the leaf, and pass through the perforations in the ears H. If the projections I are then bent downward, both boxes are secured in position, while by straightening said projections I either or both boxes may be readily removed, should such removal become at any time desirable.

My invention is used as follows: The gut-loop G of the fly is engaged with the small hook d, terminating one of the helical springs D, and the spring is withdrawn from the box C sufficiently to enable the fish-hook of the fly to be engaged with that retaining-hook B which is opposite the said box. The spring, being then released, retracts and confines the fly in its proper position in the book. When a fly is to be removed from the book, the fly is seized, and the spring is withdrawn until the fish-hook is disengaged from its hook B.

It is obvious that the boxes C occupy much less of the length of the page than the spiral springs or elastics heretofore in use, and that, consequently, my fly-book is practically considerably longer than a fly-book of the old style of the same measurements. It is also clear that the helical spring may be made to reach quite to the retaining-hooks B, if desired, and that then it will accommodate any length of gut, from the mere loop shown at the head of the larger fly in Fig. 1 to the long snell shown as attached to the smaller fly in that figure, while the spring may be extended to its extreme length without impairing its resiliency.

Having thus described my invention, what I claim as new, and desire to secure by Letters Patent, is—

1. In a fly-book, the combination, with a leaf of said book, of retainers to hold the fish-hooks upon which the flies are made, and helical springs opposed to said retainers, as and for the purpose described.

2. The combination of retainers for fish-hooks, with helical springs opposed to said retainers, retaining said fish-hooks in position and stretching the gut or snell attached to said fish-hooks.

In testimony that I claim the foregoing improvement in fishing-fly books, as above described, I have hereunto set my hand this 31st day of July, 1885.

HENRY P. WELLS.

Witnesses:
R. T. VAN BOSKERCK,
THOS. J. CONROY.